United States Patent
Nieh et al.

(10) Patent No.: US 9,363,385 B2
(45) Date of Patent: Jun. 7, 2016

(54) TELEPHONE NETWORK ACCESS DEVICE

(71) Applicants: AMBIT MICROSYSTEMS (SHANGHAI) LTD., Shanghai (CN); HON HAI PRECISION INDUSTRY CO., LTD., New Taipei (TW)

(72) Inventors: Yu-Chan Nieh, New Taipei (TW); Chien-Sheng Wu, New Taipei (TW); Zhen-Hua Xiong, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 14/450,420

(22) Filed: Aug. 4, 2014

(65) Prior Publication Data

US 2015/0043573 A1 Feb. 12, 2015

(30) Foreign Application Priority Data

Aug. 8, 2013 (CN) .......................... 2013 1 0343247

(51) Int. Cl.
*H04M 7/00* (2006.01)
*H04M 7/12* (2006.01)
*H04Q 3/66* (2006.01)

(52) U.S. Cl.
CPC .......... *H04M 7/1205* (2013.01); *H04M 7/0003* (2013.01); *H04Q 3/66* (2013.01); *H04Q 2213/13034* (2013.01); *H04Q 2213/13106* (2013.01); *H04Q 2213/13141* (2013.01); *H04Q 2213/13148* (2013.01); *H04Q 2213/13399* (2013.01)

(58) Field of Classification Search
None
See application file for complete search history.

(56) References Cited

U.S. PATENT DOCUMENTS

| | | | |
|---|---|---|---|
| 2004/0032861 A1 | 2/2004 | Lee | |
| 2005/0169250 A1* | 8/2005 | Kwak | H04L 29/06027 370/352 |
| 2006/0128376 A1* | 6/2006 | Alexis | H04M 1/725 455/426.1 |
| 2006/0187898 A1 | 8/2006 | Chou et al. | |
| 2011/0182286 A1* | 7/2011 | Zhang | H04M 11/062 370/352 |
| 2012/0027009 A1* | 2/2012 | Xiong | H04M 1/7385 370/352 |

FOREIGN PATENT DOCUMENTS

| | | |
|---|---|---|
| CN | 2764073 Y | 3/2006 |
| CN | 1798059 A | 7/2006 |
| CN | 1798161 A | 7/2006 |
| CN | 101272419 A | 9/2008 |
| CN | 101557447 A | 10/2009 |
| CN | 102348026 A | 2/2012 |
| CN | 103457781 A | 12/2013 |

(Continued)

*Primary Examiner* — Mohammad Adhami
(74) *Attorney, Agent, or Firm* — Novak Druce Connolly Bove + Quigg LLP

(57) ABSTRACT

A telephone network access device switchable between a VOIP service and a PSTN service includes an RJ-11 port, a voice splitter, a first relay, a second relay, a SLIC chip, a CPU, and a ring detection unit. The ring detection unit outputs a first switch signal in response to detecting a ring signal of a PSTN communication. The second relay connects the telephone to the VOIP network in response to a power on event. The CPU controls the first relay and the second relay to connect the telephone to the PSTN network in response to the CPU receiving the first switch signal, and controls the second relay to reconnect the telephone to the VOIP network when the PSTN communication ends.

6 Claims, 2 Drawing Sheets

(56) References Cited

FOREIGN PATENT DOCUMENTS

| | | |
|---|---|---|
| JP | 2008306375 A | 12/2008 |
| JP | 2009225090 A | 10/2009 |
| TW | I363536 | 5/2012 |
| TW | I364956 | 5/2012 |
| WO | 2011059607 A2 | 5/2011 |

* cited by examiner

TELEPHONE NETWORK ACCESS DEVICE

FIELD

The disclosure relates to telephone networks, and particularly to a telephone network access device.

BACKGROUND

When a voice over internet protocol (VOIP) telephone is connected to a public switched telephone network (PSTN) network, the VOIP telephone can provide PSTN telephone service. When the VOIP telephone is connected to a VOIP network, the VOIP telephone can provide VOIP telephone service.

BRIEF DESCRIPTION OF THE DRAWINGS

Implementations of the present technology will now be described, by way of example only, with reference to the attached figures.

DETAILED DESCRIPTION

Figure 1:
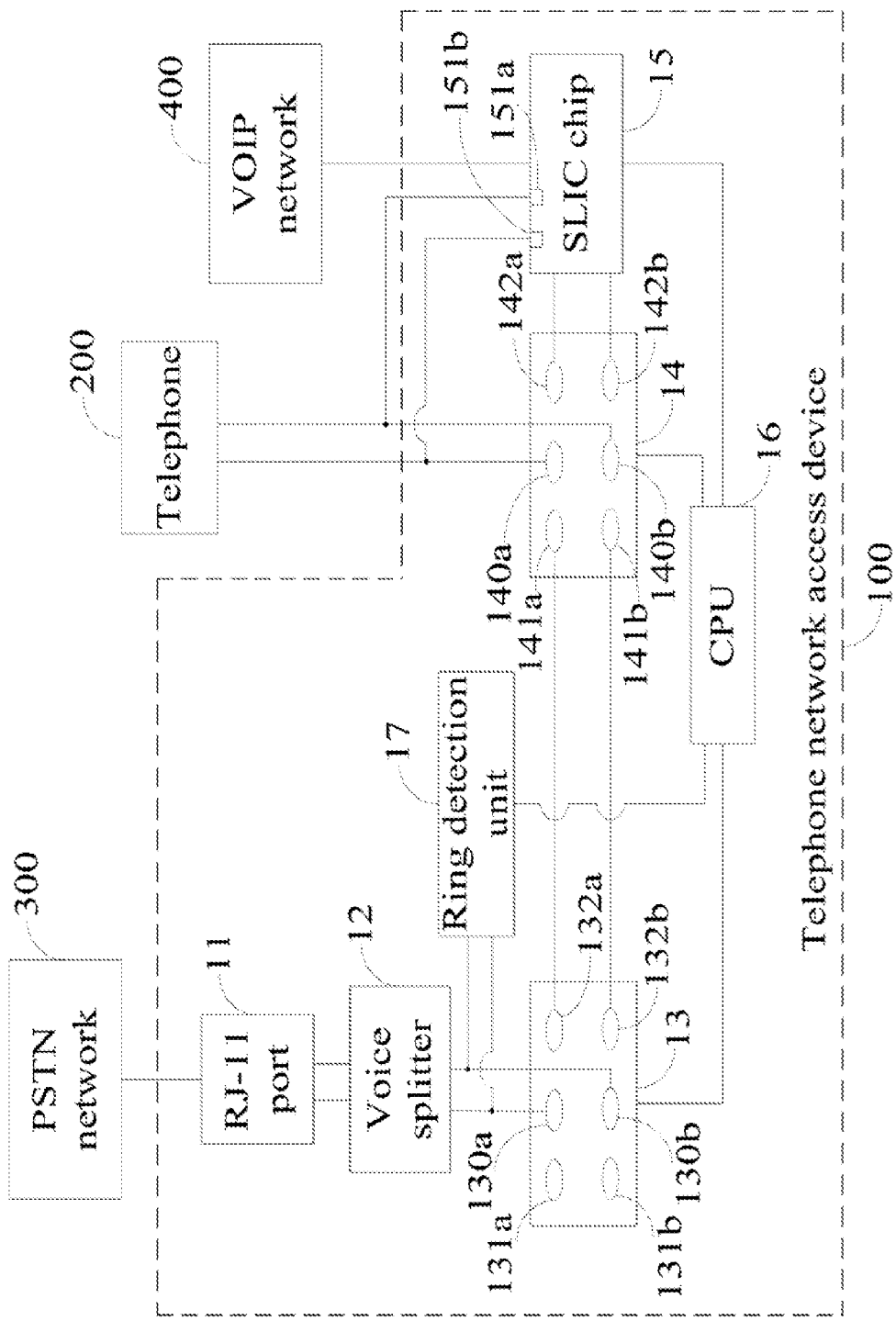
FIG. 1 is a diagrammatic view of a first embodiment of a telephone network access device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation a telephone network access device.

FIG. 1 illustrates a telephone network access device 100. In one embodiment, the telephone network access device 100 connects a telephone 200 to a public switched telephone network (PSTN) network 300 and to a voice over internet protocol (VOIP) network 400, to provide both PSTN telephone service and VOIP telephone service for the telephone 200.

In one embodiment, the telephone network access device 100 can be an integrated access device (IAD), or a VOIP terminal adaptor. The telephone can be an existing VOIP telephone.

The telephone network access device 100 comprises a registered jack-11 (Rj-11) port 11, a voice splitter 12, a first relay 13, a second relay 14, and a subscriber line interface circuit (SLIC) chip 15. The Rj-11 port 11, the voice splitter 12, the first relay 13, the second relay 14, and the SLIC chip 15 are coupled together in series. The Rj-11 port 11 is coupled to the PSTN network 300 via a telephone line, the SLIC chip 15 is coupled to the VOIP network 400, and the telephone 200 is coupled to the second relay 14 via a telephone line.

In one embodiment, the telephone network access device 100 further comprises a central processing unit (CPU) 16 and a ring detection unit 17. The CPU 16 is coupled to the first relay 13, the second relay 14, the SLIC chip 15, and the ring detection unit 17. When the telephone network access device 100 is powered on, the second relay 14 and the SLIC chip 15 connect the telephone 200 to the VOIP network 400. That is, the telephone network access device 100 sets a VOIP communication mode as a default telephone service for the telephone 200. When the telephone 200 is coupled to the VOIP network 400, the telephone 200 is in the VOIP communication mode.

The ring detection unit 17 is coupled between the first relay 13 and the voice splitter 12. The ring detection unit 17 outputs a first switch signal in response to detecting a ring signal arising from a PSTN communication. The CPU 16 controls the first relay 13 and the second relay 14 to connect the telephone 200 to the PSTN network 300 in response to the CPU 16 receiving the first switch signal from the ring detection unit 17 so that a PSTN telephone service is provided for the telephone 200. The CPU 16 controls the second relay 14 to reconnect the telephone 200 to the VOIP network 400 again in response to an ending of the PSTN communication.

In one embodiment, the SLIC chip 15 comprises two feedback pins 151a, 151b coupled to the telephone line which is between the second relay 14 and the telephone 200. The SLIC chip 15 recognizes the ending of the PSTN communication via the two feedback pins 151a, 151b, and outputs a second switch signal in response to detecting a feedback signal output by the telephone 200. The CPU controls the second relay 14 to connect the telephone 200 to the VOIP network 400 in response to the CPU 16 receiving the second switch signal from the SLIC chip 15 so that a VOIP telephone service is provided for the telephone 200. In other embodiments, the SLIC chip 15 can also comprise one feedback pin coupled to a node between the telephone 200 and the second relay 14 to recognize the ending of the PSTN communication.

In one embodiment, when the PSTN communication finishes, the telephone 200 outputs the feedback signal.

The first relay 13 comprises two first control terminals 130a, 130b, two first terminals 131a, 131b, and two second terminals 132a, 132b. The two first control terminals 130a, 130b are coupled to the voice splitter 12.

The second 14 relay comprises two second control terminals 140a, 140b, two third terminals 141a, 141b, and two fourth terminals 142a, 142b. The two second control terminals 140a, 140b are coupled to the telephone 200. The two third terminals 141a, 141b are respectively coupled to the two second terminals 132a, 132b of the first relay 13. The two fourth terminals 142a, 142b are coupled to the SLIC chip 15.

In one embodiment, the two first terminals 131a, 131b and the two third terminals 141a, 141b are normally open (NO) terminals, and the two second terminals 132a, 132b and the two fourth terminals 142a, 142b are normally closed (NC) terminals.

When the CPU 16 receiving the first switch signal from the ring detection unit 17, the CPU 16 controls the two third terminals 141a, 141b of the second relay 14 turning on and the two fourth terminals 142a, 142b of the second relay 14 turning off so that the telephone 200 can connect to the PSTN network 300 via the first relay 13 and the second relay 14. When the CPU 16 receives the second switch signal from the SLIC chip 15, the CPU controls the two third terminals 141a, 141b of the second relay 14 to turn off and the two fourth terminals 142a, 142b of the second relay 14 to turn on so that the telephone 200 can connect to the VOIP network 400 via the second relay 14 and the SLIC chip 15. The telephone 200 can be automatically switched to either the PSTN network 300 or to the VOIP network 400 via the first relay 13 and the second relay 14.

Figure 2:
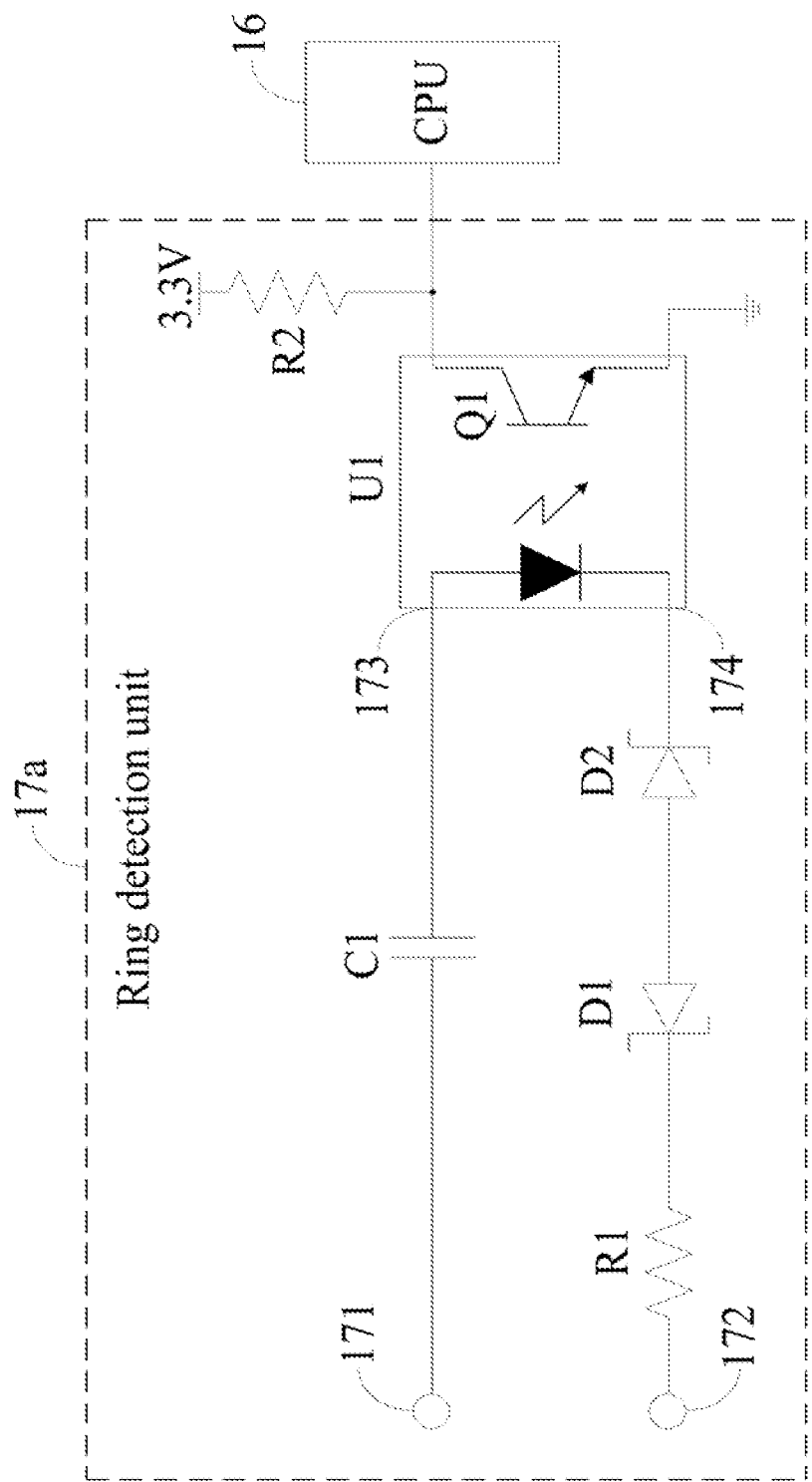
FIG. 2 is a circuit diagram of a first embodiment of a ring detection unit.

FIG. 2 illustrates a circuit diagram of a first embodiment of a ring detection unit 17a. In one embodiment, the ring detection unit 17a comprises a first terminal 171, a second terminal 172, a dual direction coupler U1, a capacitor C1, a first resistor R1, a second resistor R2, a first zener diode D1, and a second zener diode D2. The first terminal 171 of the ring detection unit 17a and the second terminal 172 of the ring detection unit 17a are respectively coupled to two nodes between the voice splitter 12 and the two first control terminals of the first relay 13. The dual direction coupler U1 comprises a first input terminal 173, a second input terminal 174, and a triode Q1. The first input terminal 173 is coupled to a first end of the capacitor C1 and a second end of the capacitor C1 is coupled to the first terminal 171 of the ring detection unit 17a. The second input terminal 174 is coupled to a cathode of the second zener diode D2, an anode of the second zener diode D2 is coupled to an anode of the first zener diode D1, a cathode of the first zener diode D1 is coupled to a first end of the first resistor R1, and a second end of the first resistor R1 is coupled to the second terminal 172 of the ring detection unit 17a. An emitter of the triode Q1 is grounded and a collector of the triode Q1 is coupled to the CPU 16. A first end of the second resistor R2 is coupled to a node between the triode Q1 and the CPU 16, and a second end of the second resistor R2 receives a reference voltage. In one embodiment, a value of the reference voltage is 3.3V.

When the ring detection unit 17a detects the ring signal of a PSTN communication, the first zener diode D1 undergoes reverse breakdown, and the second zener diode D2 is turned on. The dual direction coupler U1 outputs a first periodic square-wave signal to the CPU 16 via the collector of the triode Q1. The CPU 16 controls the first relay 13 and the second relay 14 to connect the telephone 200 to the PSTN network 300 according to the first periodic square-wave signal.

In one embodiment, a frequency of the first periodic square-wave signal is equivalent to a frequency of the ring signal of the PSTN communication. The first switch signal is the same as the first periodic square-wave signal.

In one embodiment, the telephone 200 obtains electrical power from the connected telephone line. When the ring detection unit 17a detects that an input voltage of the ring detection unit 17a is greater than a predetermined voltage, the dual direction coupler U1 outputs a second periodic square-wave signal to the CPU via the collector of the triode Q1. The CPU 16 controls the first relay 13 to disconnect from the second relay 14 in response to receiving the second periodic square-wave signal from the ring detection unit 17a, to avoid a short-circuit of the telephone line that might damage the telephone 200.

In one embodiment, a value of the predetermined voltage is 110V. A frequency of the second periodic square-wave signal is different from the frequency of the first periodic square-wave signal.

When the telephone 200 is used for calling a PSTN number, a user can add one or more predetermined numbers before the PSTN number is called. The CPU 16 controls the telephone 200 to connect to the PSTN network 300 when the SLIC chip 15 detects one or more predetermined numbers before the PSTN number being called.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A telephone network access device comprising:
    an RJ-11 port coupled to a public switched telephone network (PSTN) network;
    a voice splitter coupled to the RJ-11 port;
    a subscriber line interface circuit (SLIC) chip coupled to a voice over Internet protocol (VOIP) network;
    a first relay coupled to the voice splitter;
    a second relay coupled to the first relay, the SLIC chip, and a telephone;
    a ring detection unit coupled between the first relay and the voice splitter, wherein the ring detection unit outputs a first switch signal in response to detecting a ring signal from a PSTN communication; and
    a central processing unit (CPU) coupled to the first relay, the second relay, the SLIC chip, and the ring detection unit, and receiving the first switch signal from the ring detection unit;
    wherein the second relay connects the telephone to the VOIP network in response to a power on event, the CPU controls the first relay and the second relay connecting the telephone to the PSTN network in response to the CPU receiving the first switch signal from the ring detection unit, and controls the second relay reconnecting the telephone to the VOIP network in response to an ending of the PSTN communication; wherein the ring detection unit comprises:
    a first terminal;
    a second terminal;
    a triode;
    a dual direction coupler comprising a first input terminal coupled to the first terminal, a second input terminal coupled to the second terminal via two zener diodes that connect in series opposing directions, and outputting the first switch signal to the CPU;
    wherein an emitter of the triode is coupled to a ground, a collector of the triode is coupled to the CPU, the first input terminal of the dual direction coupler coupled to the first terminal via a capacitor, the second input terminal of the dual direction coupler coupled to the second terminal via a resistor, and the dual direction coupler outputs a first periodic square-wave signal to the CPU via the collector of the triode in response to the dual direction coupler detecting the ring signal; and
    wherein the first switch signal is the same as the first periodic square-wave signal.

2. The telephone network access device of claim 1, wherein the first relay comprises two first control terminals coupled to the voice splitter, two first terminals, and two second terminals; the second relay comprises two second control terminals coupled to the telephone, two third terminals coupled to the two second terminals of the first relay, respectively, and two fourth terminals coupled to the SLIC chip, the two first terminals and the two third terminals are normally open terminals, and the two second terminals and the two fourth terminals are normally closed terminals.

3. The telephone network access device of claim 2, wherein the CPU is configured to turn on the two third terminals of the second relay and configured to turn off the two fourth terminals of the second relay in response to the CPU receiving the first switch signal so that the telephone is coupled to the PSTN network via the first relay and the second relay.

4. The telephone network access device of claim 2, wherein the SLIC chip comprises a feedback pin coupled to between the second relay and the telephone; the SLIC chip outputs a second switch signal in response to the feedback pin detecting a feedback signal output by the telephone that the PSTN communication ends, and the CPU is configured to turn off the two third terminals of the second relay and configured to turn on the two fourth terminals of the second relay in response to the CPU receiving the second switch signal so that the telephone is coupled to the VOIP network via the second relay.

5. The telephone network access device of claim 1, wherein the dual direction coupler outputs a second periodic square-wave signal to the CPU via the collector of the triode in response to an input voltage of the ring detection unit being greater than a predetermined voltage, and the CPU is configured to disconnect the first relay from the second relay in response to receiving the second periodic square-wave signal.

6. The telephone network access device of claim 1, wherein the CPU is configured to connect the telephone coupled to the PSTN network in response to the SLIC chip detecting one or more predetermined numbers existing before a call number.

* * * * *